US012695783B1

(12) United States Patent
McNutt et al.

(10) Patent No.: US 12,695,783 B1
(45) Date of Patent: Jul. 28, 2026

(54) DETECTING NETWORK ATTACKS BASED ON QUANTUM-SAFETY OF CONNECTIONS

(71) Applicant: FORESCOUT TECHNOLOGIES, INC., San Jose, CA (US)

(72) Inventors: Robert McNutt, Cream Ridge, NJ (US); Daniel Ricardo dos Santos, Rotterdam (NL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 19/391,970

(22) Filed: Nov. 17, 2025

(51) Int. Cl.
*H04L 9/40* (2022.01)

(52) U.S. Cl.
CPC ...... *H04L 63/1433* (2013.01); *H04L 63/0428* (2013.01)

(58) Field of Classification Search
CPC ..................... H04L 63/1433; H04L 63/0428
See application file for complete search history.

(56) References Cited

U.S. PATENT DOCUMENTS

| | | | | |
|---|---|---|---|---|
| 11,153,080 B1 * | 10/2021 | Nix | .................. | H04L 9/3093 |
| 12,010,210 B1 * | 6/2024 | McNutt | .............. | H04L 9/0852 |
| 12,107,878 B1 * | 10/2024 | Mathews | ............ | H04L 63/20 |
| 2023/0308424 A1 * | 9/2023 | Nix | .................. | H04L 9/3242 |
| 2025/0330333 A1 * | 10/2025 | Cho | .................. | H04L 9/0825 |

FOREIGN PATENT DOCUMENTS

| | | | | | |
|---|---|---|---|---|---|
| CN | 119109601 A | * | 12/2024 | ........... | H04L 9/0852 |
| CN | 120498900 A | * | 8/2025 | | |

* cited by examiner

*Primary Examiner* — Mohammed Waliullah
(74) *Attorney, Agent, or Firm* — Womble Bond Dickinson (US) LLP

(57) ABSTRACT

A processing device is configured to detect potential encryption downgrades in network communications. The processing device accesses network traffic and detects an attempted first connection between a first entity and a second entity in which the first entity offered at least one post-quantum cryptography (PQC) algorithm to encrypt the attempted first connection. The method detects that the attempted first connection failed, and that a second connection between the first entity and the second entity successfully completed without a PQC algorithm, within a threshold time after the attempted first connection. The processing device identifies this second detection as a downgrade attack and performs a remedial action.

20 Claims, 7 Drawing Sheets

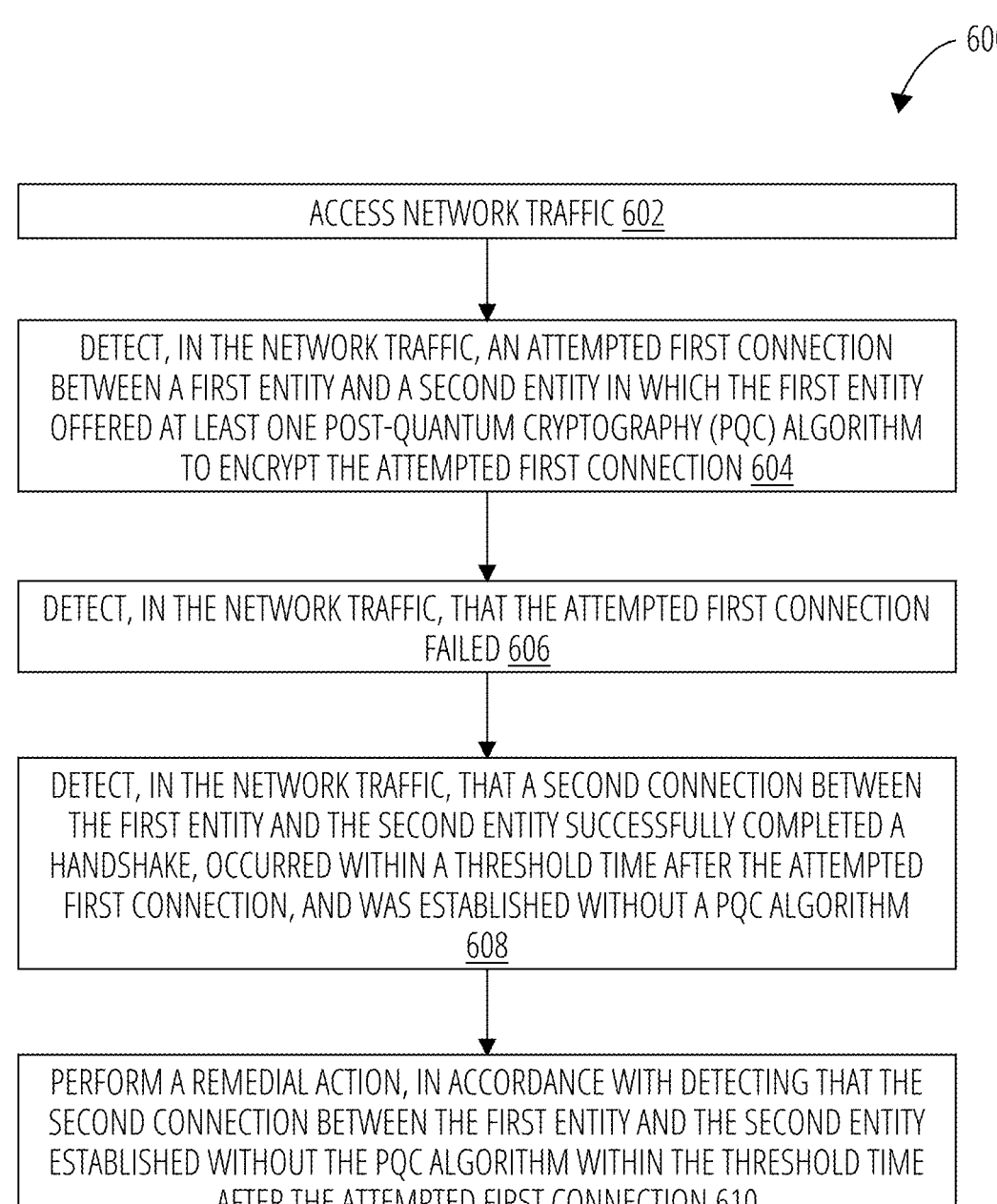

ACCESS NETWORK TRAFFIC 602

DETECT, IN THE NETWORK TRAFFIC, AN ATTEMPTED FIRST CONNECTION BETWEEN A FIRST ENTITY AND A SECOND ENTITY IN WHICH THE FIRST ENTITY OFFERED AT LEAST ONE POST-QUANTUM CRYPTOGRAPHY (PQC) ALGORITHM TO ENCRYPT THE ATTEMPTED FIRST CONNECTION 604

DETECT, IN THE NETWORK TRAFFIC, THAT THE ATTEMPTED FIRST CONNECTION FAILED 606

DETECT, IN THE NETWORK TRAFFIC, THAT A SECOND CONNECTION BETWEEN THE FIRST ENTITY AND THE SECOND ENTITY SUCCESSFULLY COMPLETED A HANDSHAKE, OCCURRED WITHIN A THRESHOLD TIME AFTER THE ATTEMPTED FIRST CONNECTION, AND WAS ESTABLISHED WITHOUT A PQC ALGORITHM 608

PERFORM A REMEDIAL ACTION, IN ACCORDANCE WITH DETECTING THAT THE SECOND CONNECTION BETWEEN THE FIRST ENTITY AND THE SECOND ENTITY ESTABLISHED WITHOUT THE PQC ALGORITHM WITHIN THE THRESHOLD TIME AFTER THE ATTEMPTED FIRST CONNECTION 610

FIG. 6

DETECTING NETWORK ATTACKS BASED ON QUANTUM-SAFETY OF CONNECTIONS

TECHNICAL FIELD

Aspects and implementations of the present disclosure relate to network monitoring, and more specifically, to detecting downgrade attacks or performing profile-based analysis, in view of cryptographic quantum-safety.

BACKGROUND

Computing devices may communicate with each over a computer network. In a computer network, computing devices can be communicatively coupled to each other over physically wired, optical, or wireless radio-frequency technology. As technology advances, the number and variety of devices that communicate over computer networks increase, as does the amount of data and importance of such data on each computing device. Protection of computing devices and the data against malicious attacks, is a central concern. Computer networks may be analyzed and security risks may be mitigated.

Quantum computing is a field of computing technology that utilizes principles from quantum mechanics to perform calculations much faster than classical computers. Classical computers use bits as the basic unit of data, which can represent either a 0 or a 1. Quantum computers use quantum bits which are referred to as qubits. These qubits can represent 0, 1, or a superposition of both 0 and 1 states simultaneously using the phenomenon which is referred to as entanglement. With entanglement, qubits become correlated in such a way that the state of one qubit is dependent on the state of another, regardless of the distance between them. This property allows quantum computers to process information and perform calculations much faster than classical computers which are limited to using traditional binary bits. With the increased computational capabilities, quantum computing has the potential to revolutionize various fields, including cryptography and cybersecurity.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding.

FIG. 6 illustrates an example method for determining cybersecurity risk for network entities based at least on quantum safety in view of a downgrade attack, in accordance with some embodiments.

DETAILED DESCRIPTION

Figure 1:
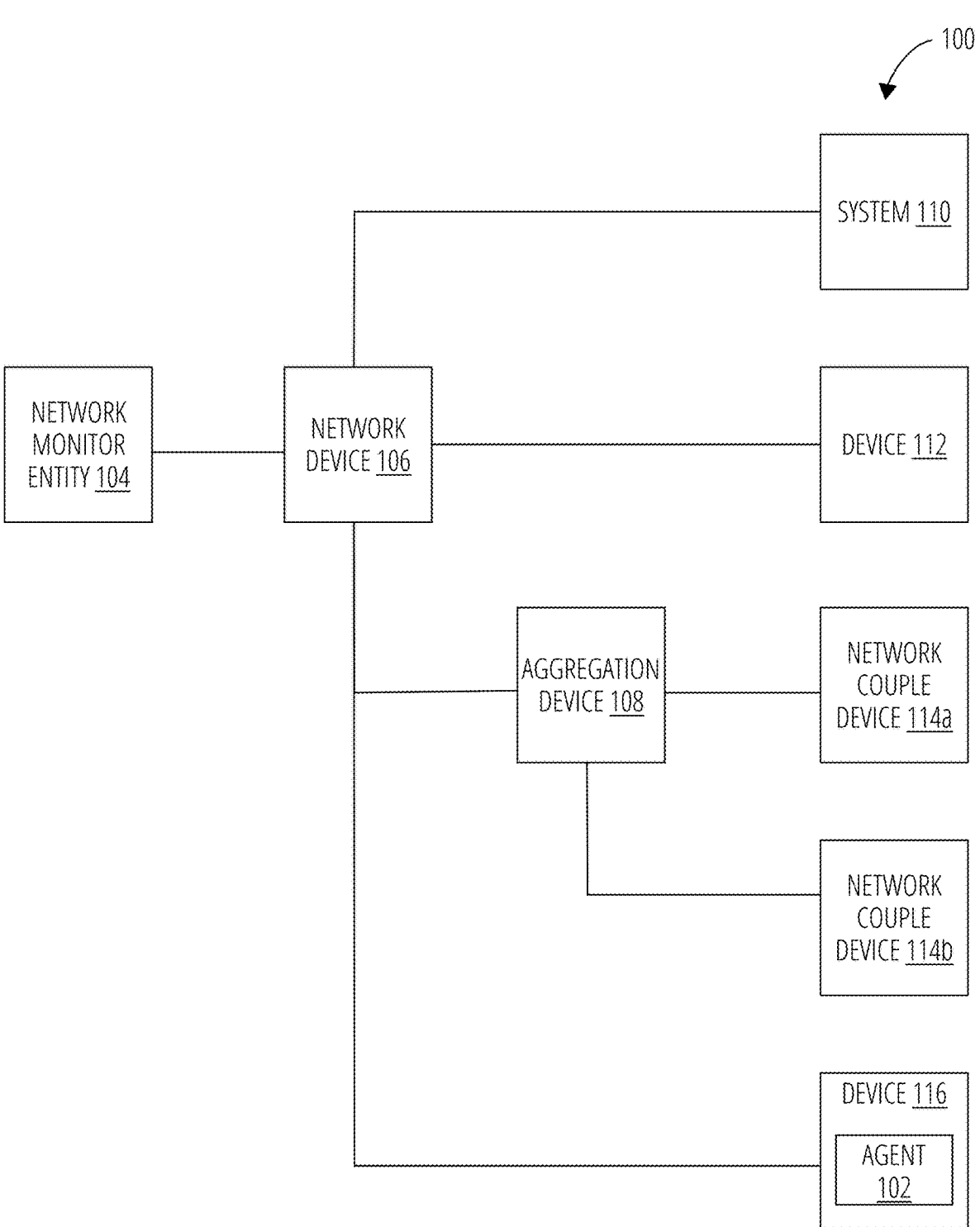
FIG. 1 depicts an illustrative communication network, in accordance some embodiments of the present disclosure.

Aspects and implementations of the present disclosure are directed to analyzing and managing security risks of a network that are associated with quantum computing. Aspects described may determine cryptographic quantum-safety for network assets and respond accordingly.

Aspects and implementations of the present disclosure are directed to analyzing and managing security risks of a network that are associated with quantum computing. Aspects described may determine cryptographic quantum-safety for network entities and respond accordingly.

With the rapid advance of quantum computing and the possibility of a cryptographically-relevant quantum computer (CRQC) breaking traditional asymmetric encryption schemes such as Rivest Shamir Adleman (RSA) in the next few years, there may be a need to migrate to post-quantum cryptographic (PQC) algorithms which may also be referred to as quantum-safe algorithms. A PQC algorithm may be a computer encryption algorithm that has been deemed (e.g., by experts or governing bodies) to be safe or resistant to quantum computers breaking the encryption (e.g., by decrypting or solving a problem of the encryption without an authorized key). Such a risk holds especially true for networks that support critical infrastructure sectors.

Computer encryption is a security technique that protects information by converting it into a code (encryption), making it unreadable without a decryption key. Encryption is used to support the confidentiality, integrity, and authenticity of data, which is useful especially in the context of computer networks and critical or sensitive data and operations. Encryption may be performed using different encryption (e.g., mathematical) algorithms and keys. Plaintext data is the original readable data, such as a message or a file. Ciphertext is the encrypted version of the plaintext. It appears as a random sequence of characters and is unreadable without the decryption key. An encryption algorithm may be a mathematical process that transforms plaintext into ciphertext. It uses specific algorithms such as, for example, AES (Advanced Encryption Standard), RSA (Rivest-Shamir-Adleman), DES (Data Encryption Standard), or other encryption algorithms or variations thereof. Some algorithms (which may also be referred to as a cipher) may be resistant to quantum computing decryption (without a key) while others may not. Those that are understood as resistant may be deemed to be PQC algorithms and quantum-safe. An encryption key is a unique piece of information used to control the encryption and decryption processes. The encryption key may be used to convert plaintext to ciphertext, and the decryption key is used to revert ciphertext to plaintext.

Encryption may be symmetric or asymmetric. In symmetric encryption, the same key is used for both encryption and decryption. Both the sender and the receiver need to possess the same key. In asymmetric encryption, a pair of keys are used. A public key is used for encryption and a private key used for decryption. Messages encrypted with the public key can only be decrypted with the corresponding private key. This approach provides a higher level of security than symmetric encryption and eliminates the need for both parties to share the same key. End to end encryption ensures that only the sender and the intended recipient can read the encrypted messages. For example, even the service provider that facilitates the communication cannot access the decrypted content. Transport Layer Security (TLS) is a network protocol that ensures secure communication over computer networks. It may use a combination of symmetric and asymmetric encryption to secure data transmission over the internet, commonly used for secure browsing (e.g., HTTPS).

A cipher suite is a combination of cryptographic algorithms and protocols used to establish secure communications over a computer network. It defines the set of encryption, authentication, signature, and key exchange algorithms that will be used during a secure connection between two parties, such as a client and a server. Cipher suites are commonly used in protocols like Secure Shell (SSH), Transport Layer Security (TLS), and Secure Sockets Layer (SSL), to ensure the confidentiality and integrity of data exchanged over the network.

A typical cipher suite includes several components such as, for example, a key exchange algorithm, an authentication algorithm, a bulk encryption algorithm, a message authentication code algorithm, a compression algorithm, or other algorithms. During the handshake process when communication is to be established over a given protocol, assets (e.g., entities or devices) may exchange which algorithms of each type are supported. A key exchange algorithm is used to securely exchange encryption keys between the communicating parties. Examples include RSA, Diffie-Hellman (DH), and Elliptic Curve Diffie-Hellman (ECDH). An authentication algorithm verifies the identity of the parties involved in the communication. It ensures that the entities are who they claim to be. This involves methods like public key authentication, password-based authentication, or certificate-based authentication. Common authentication methods include RSA, Digital Signatures, and Elliptic Curve Digital Signature Algorithm (ECDSA). A bulk encryption algorithm may be used for encrypting and decrypting the actual data being transmitted. Examples include Advanced Encryption Standard (AES), Triple DES (3DES), and Cha-Cha20. A Message Authentication Code (MAC) algorithm ensures the integrity of the transmitted data by generating a checksum that is appended to the data. MAC algorithms may include HMAC-SHA256 and HMAC-SHA512.

National institute of Standards and Technology (NIST) has led a PQC standardization effort since 2016 and in 2022 selected Kyber as the first PQC algorithm for Key Encapsulation Mechanism (KEM) to be standardized. The final standard was published in August 2024 as FIPS 203 "Module-Lattice-Based Key-Encapsulation Mechanism Standard" (ML-KEM) and included as part of official cipher suites by the Internet Engineering Task Force (IETF). This is now being adopted by commercial cloud providers and modern web browsers as well as embedded devices, such as Internet of Things (IoT) and Operational Technology (OT) equipment.

More practically, OpenSSH v10 uses ML-KEM by default. Millions of internet connected devices using OpenSSH already support this PQC method.

Existing systems may focus on spotting known exploits or signature-matched behaviors within specific protocols, and therefore fail to reliably detect, more generally, that a downgrade from quantum-safe to quantum-unsafe encryption has occurred across diverse attack paths. This leaves systems vulnerable to downgrade attacks during the PQC migration. For example, an adversary-in-the-middle can interfere with handshakes between devices to suppress or strip post-quantum options, induce version/cipher renegotiations, or cause handshake failures at moments when PQC ciphers are offered, with the intent to cause endpoints to fall back to classical (non-PQC algorithms) or even unencrypted communications (e.g., plain text). Even where modern protocols may include anti-downgrade defenses, gaps in real-world stacks, lax configuration of requirements, and the absence of protocol-agnostic downgrade detection, allows attackers to push connections from PQC encryption (e.g., ML-KEM) to non-PQC (e.g., RSA) without timely, trustworthy visibility.

Aspects of the present disclosure detect downgrades attacks, by observing network connections and handshakes to analyze encryption negotiations and examining what was ultimately negotiated in the established connection. The system accesses inputs (e.g., stored and/or live communications between devices and corresponding metadata) and senses handshake messages to determine when a client offered a quantum-safe algorithm. In this context, quantum-safe refers to using post-quantum cryptography (PQC) such as ML-KEM, whereas quantum-unsafe refers to using a cipher that is not PQC (e.g., RSA or other non-PQC algorithm) or using no cipher at all. The system detects that the corresponding handshake did not complete, and, within a configurable time window, identifies a subsequent successful connection between the same endpoints that negotiated a non-PQC algorithm or no cipher at all. The system takes remedial measures such as generating a downgrade alert, and/or other remedial measures. Complementing this rule-based detector, the system can maintain behavior profiles that count quantum-safe versus non-PQC outcomes and flag anomalies when a new non-PQC session appears where only PQC had been observed or where PQC has historically predominated. By comparing observed proposals and negotiated suites across different protocols and exchanges (e.g., TLS cipher suites and SSH-style key exchange, host key, encryption, and MAC selections) against an editable registry of PQC and non-PQC algorithms, the system provides timely, protocol-aware, and attack-agnostic visibility into downgrade attacks (e.g., where a malicious actor causes an entity to downgrade from a PQC connection attempt to a non-PQC connection) and other anomalous behavior (e.g., a non-PQC connection with an entity that typically exercises PQC connections).

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance some embodiments of the present disclosure. The communication network 100 includes a network monitor entity 104, a network device 106, an aggregation device 108, a system 110, devices 112 and 116, and network coupled devices 114a and 114b. The devices 112 and 116 and network coupled devices 114a and 114b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 106 may be one or more network devices configured to facilitate communication among aggregation device 108, system 110, network monitor entity 104, devices 112 and 116, and network coupled devices 114a and 114b. Network device 106 may be one or more network switches, access points, routers, firewalls, hubs, etc.

Network monitor entity 104 may be operable for a variety of tasks including determining data that is held on each of one or more devices on a network, determining a security risk of the device based at least on the data (e.g., whether or not the data is sensitive), and segmenting the network in response to if the security risk satisfies a threshold, such that accessibility to the offending device is reduced. In some embodiments, network monitor entity 104 can use local resources (e.g., processing, memory, data resources, or other resources), cloud resources, or a combination thereof for such an operation. In various embodiments, various libraries or an application programming interface (API) may be used to perform the operations of the network monitor entity 104.

Network monitor entity 104 can determine one or more enforcement points where the device is communicatively coupled to the network and thereby determine the one or more enforcement points closest to the device. For example, network monitor entity 104 may access information on a switch (e.g., a switch cache) to determine a port (e.g., physical port, wireless port, or virtual port) where a device with a particular Internet Protocol (IP) address or Medium Access Control (MAC) address or other identifier is communicatively coupled. Network monitor entity 104 may also access information from a wireless access point where the device is communicatively coupled. In some embodiments, network monitor entity 104 may poll information from a cloud service to determine where a device is communicatively coupled or connected to a network. In various embodiments, network monitor entity 104 may access syslog or Simple Network Management Protocol (SNMP) information from a device itself to determine where a device is communicatively coupled or connected to a network (e.g., without accessing information from a network device or enforcement point). Network monitor entity 104 supports applying access policies in situations where a device is communicatively coupled to a network with more than one connection (e.g., a wired connection and a wireless connection).

Based on the enforcement point, network monitor entity 104 may determine the one or more access rules to be assigned to the one or more enforcement points based on an access policy. In some embodiments, based on information about the one or more enforcement points closest to the device, network monitor entity 104 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communicatively coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 104 may access the current configuration of the one or more enforcement points to determine the access rules (e.g., Access Control Lists-ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 104 may then apply or assign the access rules to the one or more enforcement points closest to the device. Network monitor entity 104 may communicate the access rules via application programming interfaces (APIs), command line interface (CLI) commands, Web interface, simple network management protocol (SNMP) interface, etc. In some embodiments, network monitor entity 104 may verify that the one or more enforcement points have been properly or correctly configured based on the access rules.

Network monitor entity 104 may provide an interface (e.g., a graphical user interface (GUI)) for viewing, monitoring, and modifying classification or associated thresholds associated with one or more models. Network monitor entity 104 may further monitor network traffic over time to reclassify entities as new entities join the network, entities rejoin the network, and new models are made available.

Network monitor entity 104 may further perform a variety of operations including identification, classification, and taking one or more remediation actions (e.g., changing network access of a device, changing the virtual local area network (VLAN), sending an email, sending a short message service (SMS) message, etc.).

Network monitor entity 104 may also parse network traffic. For example, the network monitor entity 104 may parse (e.g., read, analyze, access, etc.) different protocol fields of the network traffic (e.g., packets, messages, frames, etc.). The network monitor entity 104 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 104 may include a parser and one or more processing engines, as described herein.

An enforcement point may be a router, firewall, switch, hypervisor, software-defined networking (SDN) controller, virtual firewall, or other network device or infrastructure that may have an ACL-like or rule-like policy or functionality to apply based on the port where a device is communicatively coupled thereto. Enforcements points may also be a next generation firewall (NGFW) and cloud infrastructure. A NGFW can be updated with an ACL-like policy regarding a device accessing the Internet. Cloud infrastructure (e.g., Amazon web services (AWS) security groups) can be updated to drop packets from the IP address of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 104 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 104 may be communicatively coupled to the network device 106 in such a way as to receive network traffic flowing through the network device 106 (e.g., port mirroring, sniffing, acting as a proxy, passive monitoring, etc.). In some embodiments, network monitor entity 104 may include one or more of the aforementioned devices. In various embodiments, network monitor entity 104 may further support high availability and disaster recovery (e.g., via one or more redundant devices).

In some embodiments, network monitor entity 104 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 104 may be based on a combination of one or more pieces of information including traffic analysis, information from external or remote systems (e.g., system 110), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 104 may be operable to use one or more APIs to communicate with aggregation device 108, device 112, device 116, or system 110. Network monitor entity 104 may monitor for or scan for entities that are communicatively coupled to a network via a Network Address Translation (NAT) device (e.g., firewall, router, etc.) dynamically, periodically, or a combination thereof.

Information from one or more external or third party systems (e.g., system 110) may further be used for determining one or more tags or characteristics for a device. For example, a vulnerability assessment (VA) system may be queried to verify or check if a device is in compliance and provide that information to network monitor entity 104. External or third party systems may also be used to perform a scan or a check on a device to determine a software version.

Device 116 can include agent 102. The agent 102 may be a hardware component, software component, or some combination thereof configured to gather information associated with device 116 and send that information to network monitor entity 104. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 102 may be configured to provide different levels and pieces of information based on device 116 and the information available to agent 102 from device 116. Agent 102 may be able to store logs of information associated with device 116. Network monitor entity 104 may utilize agent information from the agent 102. While network monitor entity 104 may be able to receive information from agent 102, installation or execution of agent 102 on many entities may not be possible, e.g., IoT or smart devices.

System 110 may be one or more external, remote, or third party systems (e.g., separate) from network monitor entity 104 and may have information about devices 112 and 116 and network coupled devices 114a and 114b. System 110 may include a vulnerability assessment (VA) system, a threat detection (TD) system, endpoint management system, a mobile device management (MDM) system, a firewall (FW) system, a switch system, an access point system, etc. Network monitor entity 104 may be configured to communicate with system 110 to obtain information about devices 112 and 116 and network coupled device 114a and network couple device 114b on a periodic basis, as described herein. For example, system 110 may be a vulnerability assessment system configured to determine if device 112 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 104.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 104.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 104.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 106 or aggregation device 108) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 104 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 108 may be configured to communicate with network coupled devices 114a and 114b and provide network access to network coupled devices 114a and 114b. Aggregation device 108 may further be configured to provide information (e.g., operating system, device software information, device software versions, device names, application present, running, or both, vulnerabilities, patch level, etc.) to network monitor entity 104 about the network coupled devices 114a and 114b. Aggregation device 108 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 108 may be coupled to the network device 106 via an Ethernet connection and coupled to network coupled devices 114a and 114b via a wireless connection. Aggregation device 108 may be configured to communicate with network coupled devices 114a and 114b using a standard protocol with proprietary extensions or modifications.

Aggregation device 108 may further provide log information of activity and properties of network coupled devices 114a and 114b to network monitor entity 104. It is appreciated that log information may be particularly reliable for stable network environments (e.g., where the types of devices on the network do not change often). The log information may include information of updates of software of network coupled devices 114a and 114b.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, or other network components or devices may be used to enforce segmentation on a network (and different address subnets may be used for each segment). Enforcement points may enforce segmentation by filtering or dropping packets according to the network segmentation policies/rules.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network. A segmentation policy or suggestion may include access rules that are determined to reduce a security risk of one or more devices on the network.

In an aspect, network monitor entity 104 may access network traffic that is associated with entities (e.g., devices 112, 116, and/or other devices or entities). The network traffic may be obtained from network device 106 and/or aggregation device 108, and may comprise metadata and/or raw data that is parsed by network monitor entity 104 to detect a first attempted connection between two entities. By analyzing the network traffic, network monitor entity 104 may detect that the first attempted connection failed, and that a second connection was established between the same entities within a threshold time. The network monitor entity 104 may detect that the first attempted connection was attempted with a PQC algorithm, while the second connection was established with a non-PQC algorithm. In response, the network monitor entity 104 may deem that the entity (e.g., a client device) has experienced a downgrade attack and take remedial action, as described in other sections.

Additionally, or alternatively, network monitor entity 104 may store and manage profiles that represent historical connections of an entity. The network monitor entity 104 may store and manage a profile for each entity that is tracked. Each profile may include a record or statistics of each of a plurality of past connections, a source and destination of each connection, a communication protocol and version thereof (e.g., TLS 1.2, TLS 1.3, SSH-1, SSH-2, etc.), a first count of those past connections between the source and the destination with that communication protocol that are PQC, and a second count of those past connections between the source and the destination using that protocol that are non-PQC. The profile keeps records of each of the past connections keyed by source, destination, and protocol, with the first count and the second count indicating a baseline or established history of communication between those two entities (the source and the destination). If the network monitor entity 104 detects a new connection that established with a non-PQC algorithm, and this runs contrary to the baseline, the network monitor entity 104 may take remedial action, as described in other sections.

In some embodiments, network monitor entity 104 may perform parallel processing of the network traffic for one or more entities, by applying the rule-based methodology to determine whether a downgrade attack occurred, and to determine whether one or more connections with the entity were anomalous in view of the stored profile. In some embodiments, network monitor entity 104 may increase a count associated with downgrade attacks for a profile, as a remedial action when such a condition is detected. In addition to the other metadata stored by a profile (e.g., source, destination, protocol, first count, second count), the profile may also include a third count of downgrade attacks for that source, destination, and protocol.

Under a typical operation, the TLS handshake is an automated process that secures web connections by establishing encrypted communication between clients and servers. When an entity visits an HTTPS website, the client (e.g., a browser) initiates this handshake by sending a "Client Hello" message containing supported encryption methods and a random number. The server responds with its chosen encryption parameters, a random number of its own, and its digital certificate containing the server's public key. The client browser then verifies this certificate against trusted Certificate Authorities to ensure connecting to a legitimate server. The client generates a secret key, encrypts it with the server's public key, and sends it back. Both sides use their random numbers and this shared secret to generate identical encryption keys. They exchange encrypted "finished" messages to confirm everything is working correctly. This handshake process provides authentication to verify the server's identity, encryption to protect data in transit, and integrity checking to prevent tampering. The SSH handshake follows a similar security objective but is tailored for remote shell access and file transfers. The SSH handshake begins with both client and server announcing their SSH protocol versions, then negotiating which cryptographic algorithms they'll use for key exchange, encryption, authentication, and compression. They perform a key exchange (typically Diffie-Hellman) where the server also presents its host key. SSH uses a "trust on first use" model where clients store and verify server host keys locally rather than relying on Certificate Authorities. On first connection, users manually verify the server's key fingerprint, and subsequent connections check against this stored key to detect potential man-in-the-middle attacks. After establishing the secure channel, SSH includes user authentication as part of the protocol itself, supporting methods like password authentication, public key authentication where users prove ownership of their private keys, or interactive authentication prompts. However, there is still room for malicious attackers to cause an entity to first attempt connection with a PQC algorithm, and when that does not work, the entity may try a non-PQC algorithm to connect with.

Although some embodiments described involve TLS or SSH protocols, it should be understood that these are mere examples and that the described operations and methods cover any computer communication protocol that involve a negotiation of an encryption algorithm that is to be used to establish the connection.

Figure 2:
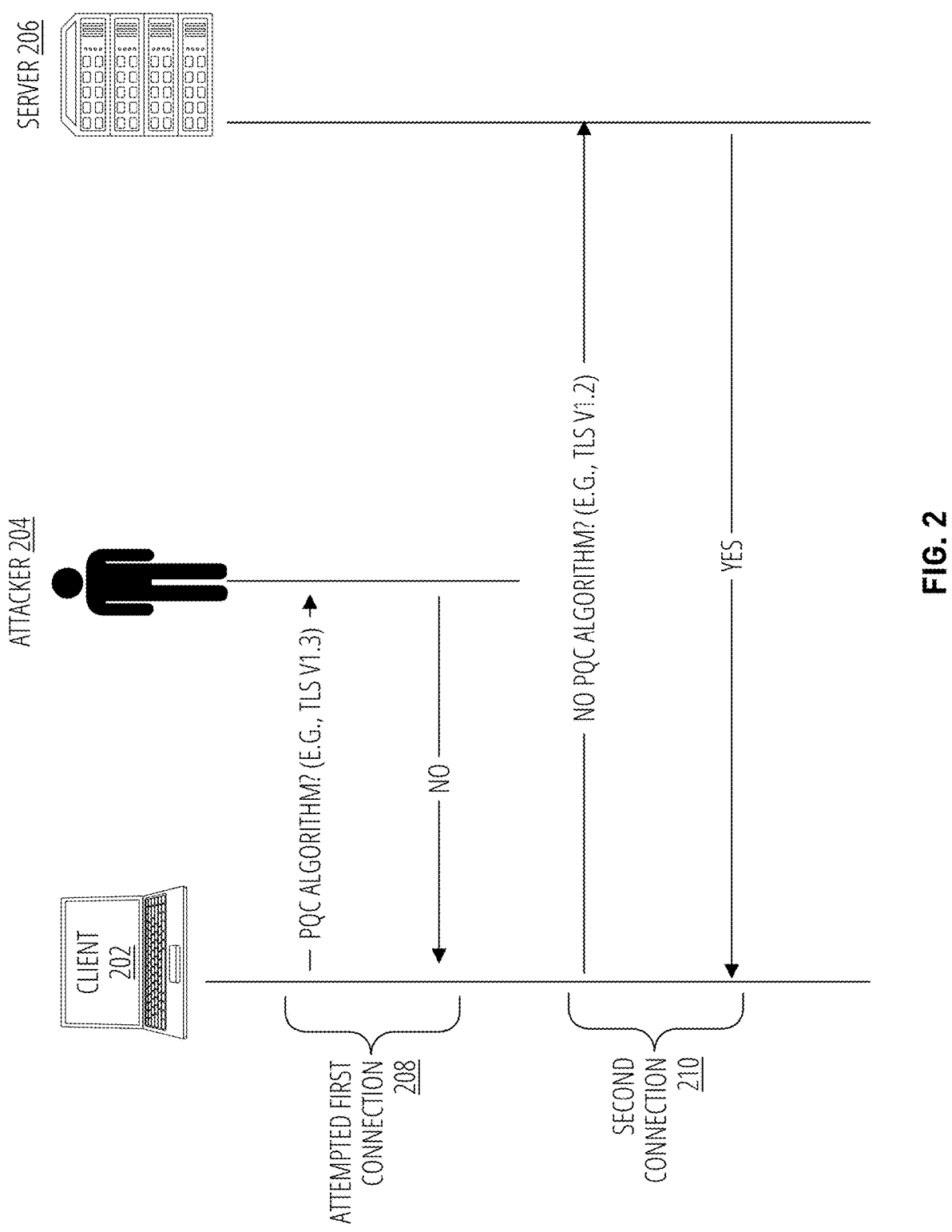
FIG. 2 illustrates an example in which an attacker downgrades encrypted communications from quantum-safe to quantum-unsafe between a client and a server, in accordance with some embodiments.

FIG. 2 illustrates an example in which an attacker downgrades encrypted communications from quantum-safe to quantum-unsafe between a client and a server, in accordance with some embodiments. Client 202 and server 206 may correspond to entities such as a first entity and a second entity, or other entities, as described in other sections.

A client 202 attempts to establish a PQC encrypted session with a server 206 while an attacker 204 operates as an adversary-in-the-middle between them on the network path. As mentioned, quantum-safe refers to using post-quantum cryptography (PQC) such as, for example, ML-KEM, whereas quantum-unsafe refers to using a cipher that is not PQC (e.g., RSA) or using no cipher at all.

The client 202 initiates an attempted first connection 208 to the server 206 by proposing one or more post-quantum cryptography (PQC) algorithms during the handshake negotiation. During such handshakes, the client and server exchange information about accepted algorithms and agree on which algorithm to use, typically, both parties select the strongest algorithms accepted by each. For example, in a TLS context, the client 202 may advertise PQC key establishment (e.g., ML-KEM) and related parameters as part of a TLS 1.3 handshake. The attacker 204 intercepts this handshake and interferes with completion of the attempted first connection 208. Such interference may involve rejecting or dropping messages that include PQC parameters, spoofing responses that prevent agreement on a PQC algorithm, injecting TCP resets, or otherwise disrupting the handshake so that the attempted first connection 208 fails to complete. Downgrade attacks have historically exploited design issues in SSL/TLS, including SSL Stripping, DROWN, POODLE, FREAK, Logjam, BEAST, and SLOTH, among others. An adversary-in-the-middle can also spoof the server and participate in the handshake, as in a simplified scenario where the attacker rejects an original client request for a TLS 1.3 connection and forwards to the server only a subsequent TLS 1.2 request.

Subsequently, within a short interval after the failed attempt, the client 202 initiates a second connection 210 to the server 206. In this second connection 210, the handshake successfully completes but is negotiated without a PQC algorithm (e.g., using a quantum-unsafe (non-PQC) algorithm or no algorithm at all). For instance, the attacker 204 may forward only a downgraded request (e.g., forcing TLS 1.2 or a non-PQC key exchange such as RSA) to the server 206, or otherwise steer the negotiation away from PQC options. The end result is that the client 202 and server 206 establish the second connection 210 as quantum unsafe, even though PQC was available and initially offered by the client 202.

A processing device (e.g., network monitor entity 104) may access and parse through network traffic that includes messaging between entities. By analyzing header information, packet data, and/or metadata of this network traffic, the processing device detects the various offered algorithms from the client 202 and the responses from the attacker 204 in the attempted first connection 208, and the resulting encryption or lack thereof in the subsequent second connection 210. Poor protocol design may allow attackers to force renegotiation of cipher suites in the handshake despite downgrade defenses that may be inherent in TLS, SSH, or other protocols. For example, poor implementations of TLS, SSH, or other encrypted protocols may contain vulnerabilities that enable forced insecure connections, which is especially concerning during the quantum-migration period. Network settings that allow hybrid encryption methodologies (e.g., either PQC or non-PQC algorithms) may enable an attacker to force selection of the non-PQC option.

By correlating the failed attempted first connection 208 with the subsequent non-PQC second connection 210, the system raises an alert indicating that a downgrade may have occurred, enabling the system and/or users to investigate and respond through their existing security workflows. Although FIG. 2 depicts a TLS handshake, the same principles apply to other encrypted protocols, such as SSH, where the attacker 204 may influence or disrupt the negotiation of key exchange or host key algorithms to drive selection of non-PQC connections, including those established with non-PQC algorithms or no cipher at all.

Figure 3:
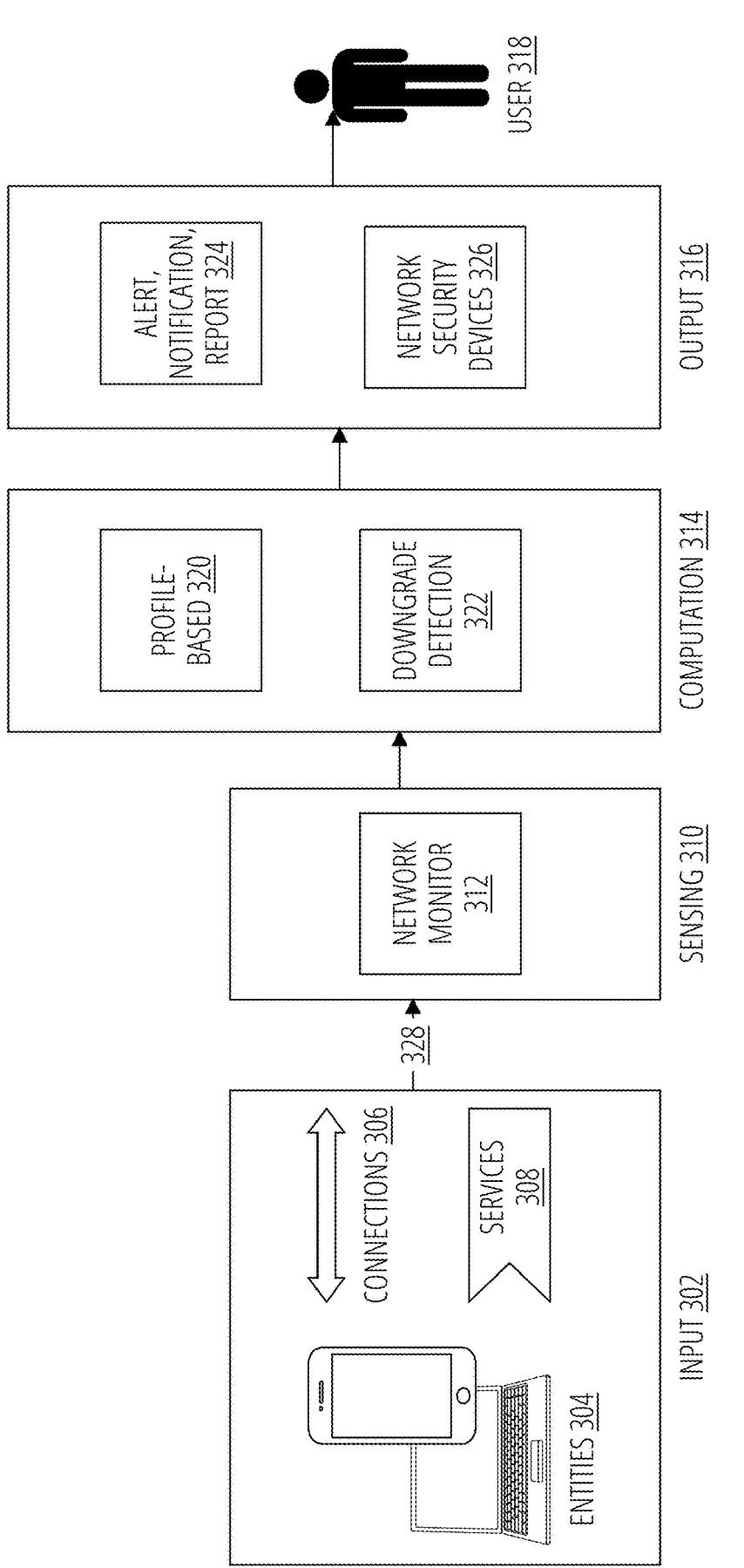
FIG. 3 shows a workflow for detecting downgrade attacks on quantum-safe communications, in accordance with some embodiments.

FIG. 3 shows a workflow for detecting downgrade attacks on quantum-safe communications, in accordance with some embodiments. A system such as network monitor entity 104, processing logic, and/or processing devices described, may perform the workflow.

At the input 302, network entities 304, such as connected devices, virtual machines, agents, services, and cloud workloads, expose and utilize network services 308 including protocols like SSH, HTTPS, and SFTP. These services 308 help entities 304 establish encrypted connections 306 with local and/or external entities over network traffic 328, typically relying on TLS cipher suites that specify, for example, key exchange (KEX) algorithms, bulk encryption algorithms, and message authentication code (MAC) algorithms. Some entities or services implement cryptographic layers rather than TLS, for instance, SSH defines a suite-like construct that includes KEX algorithms, server host key algorithms, encryption algorithms, MAC algorithms, and compression algorithms. Regardless of the protocol used, connections 306 may be established through a client-server handshake that proposes, negotiates, and agrees upon the algorithm or algorithms to be used.

In the sensing 310 stage, a network monitor 312 observes the network traffic 328 to determine which encryption algorithms are proposed and which are ultimately negotiated when connections 306 are established. By inspecting the handshake elements of communications in the network traffic 328, the network monitor 312 identifies offered cipher suites or algorithm lists and the agreed algorithm set, and compares these observations against a maintained list of known PQC ciphers. If the agreed upon cipher is on the list, then the cipher is a PQC algorithm, and the connection is treated as quantum-safe. Otherwise, the connection is treated as quantum-unsafe. Additionally, or alternately, the list may include a list of unsafe of non-PQC algorithms, encryption algorithms deemed to be vulnerable to decryption by powerful quantum computers. In that case, if the agreed upon cipher matches a non-PQC algorithm, then the connection is treated as quantum-unsafe. This enables the monitor to decide whether a given connection is quantum-safe or unsafe.

At the computation 314 stage, the system may perform one or both of complementary detection approaches. A profile-based 320 emphasizes historical interactions of an entity to detect an anomaly. A downgrade detection 322 detects when a device may have experienced a downgrade attack.

For profile-based 320, the system performs a learning phase in which it constructs, for each monitored asset 304, behavioral profiles of connections 306 that capture how frequently PQC versus non-PQC algorithms are used for specific application protocols. A representative profile can take the form (source (e.g., an entity), destination (e.g., another entity), protocol or protocols (e.g., a layer 7 protocol, a layer 6 protocol (e.g., TLS), etc.), a safe count (counting a number of quantum-safe connections of a given source-destination-protocol tuple), and an unsafe count (counting a number of quantum-unsafe connections of a given source-destination-protocol tuple)). Source identifies the client (e.g., by one or more of MAC address, IP address, TCP port, and host/domain name), and destination identifies the server using similar identifiers. Layer 7 protocol specifies the application-layer protocol so that profiles remain distinct per protocol (e.g., even when sharing a port). Examples of Layer 7 protocols include Hypertext Transfer Protocol (HTTP), secure HTTP (HTTPS), File Transfer Protocol (FTP), Simple Mail Transfer Protocol (SMTP), POP3, IMAP, SSH, Session Initiation Protocol (SIP), etc.

Safe count tracks how many times the client and server established a connection using PQC algorithms for that protocol, and unsafe count tracks how many times they communicated using non-PQC algorithms (or none at all) for that protocol. Once the learning phase concludes, e.g., automatically, based on a threshold number of observed connections, the expiration of a time period, or through user intervention, a detection phase begins. During detection, the profile-based 320 logic evaluates rules such as, for example, detecting an anomaly in response to when a new non-PQC connection (sensed in the network traffic 328) is observed for a given source, destination, and protocol tuple. The logic accesses the corresponding profile for that tuple, which may a history of only PQC connections (e.g., unsafe count=0) or close to zero (e.g., unsafe count<threshold). Additionally, or alternatively, processing logic detects that an anomaly occurs when a new non-PQC connection appears after PQC connections have historically outnumbered non-PQC connections (e.g., safe count>unsafe count). In some embodiments, processing logic may update profiles to be constrained to the most recent N connections (e.g., limited to the last N connections), and/or to a sliding time window (e.g., limited to the connections from the last M days). In response to detecting the anomaly, processing logic proceeds to output 316 and performs a remedial action.

Additionally, or alternatively, downgrade detection 322 analyzes the network traffic 328 and executes an immediate, rule-based check for the characteristic downgrade pattern. For example, when the sensing 310 stage shows that an entity attempted to establish a connection with another entity by offering a PQC algorithm, the handshake did not complete, and subsequently a non-PQC connection between the same entities is successfully established within a specified time window, processing logic deems this to be a potential downgrade and proceeds to output 316 where it performs a remedial action.

Together, the immediate downgrade detection 322 and the longer-horizon profile-based 320 provide layered detection. The downgrade detection 322 is tuned to detect acute, sequence-based downgrades. The profile-based detection is tuned to flag anomalous non-PQC events against learned norms on a per-entity basis.

At output 316 stage, the system produces an alert, notification, report 324 that can be presented directly to a user 318, such as a security analyst, for triage and investigation. The same output 316 may also be emitted in a machine-readable format to network security devices 326 and other tools (e.g., SIEMs or XDR platforms) for further analysis or automated response within existing security workflows. In some embodiments, a remedial action may include generating an alert, storing a log, decreasing a cybersecurity score of the entity, filtering or network segmentation to limit traffic flow to or from the entity, and/or other remedial action. By structuring the process across input 302, sensing 310, computation 314, and output 316, and by correlating observed handshake behaviors in network traffic 328 with learned profiles, processing logic may detect potential downgrades of quantum-safe communications, even without identifying the attack technique that caused the downgrade. In some embodiments, each of the operations described with respect to the workflow and the other methods may be performed automatically (e.g., without human input). This includes collection of network traffic data, detecting a downgrade or anomaly, and/or remedial action.

Figure 4:
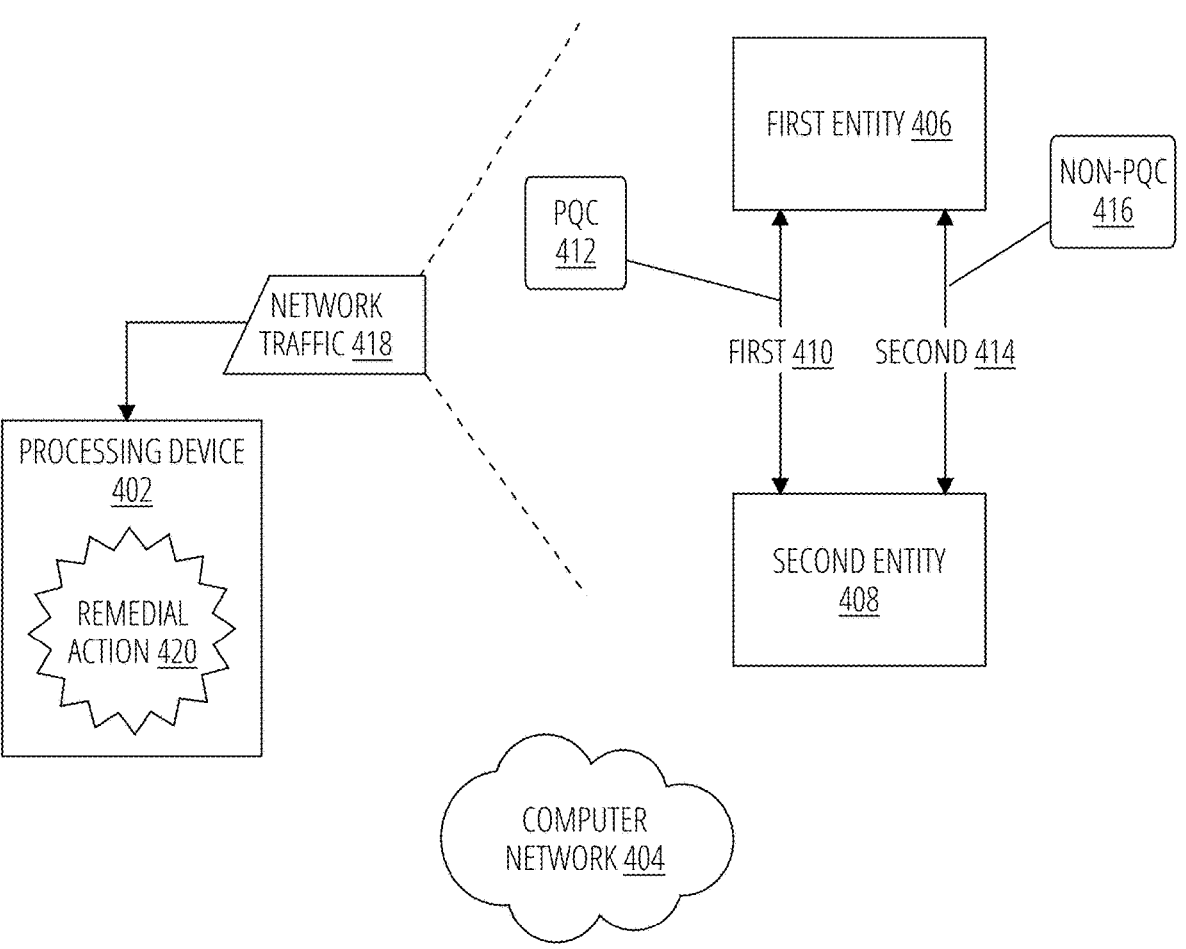
FIG. 4 illustrates a system configured to detect downgrade events when a connection transitions from a quantum-safe posture to a quantum-unsafe posture, in accordance with some embodiments.

FIG. 4 illustrates a system configured to detect downgrade events when a connection transitions from a quantum-safe posture to a quantum-unsafe posture, in accordance with some embodiments.

The system operates over a computer network 404 that may include wired, optical, and wireless segments across private and public domains. A first entity 406 and a second entity 408 are communicatively coupled to the computer network 404 and exchange network traffic 418 comprising handshake messages and encrypted session data. The network traffic 418 may be obtained from stored captures or logs (e.g., collected by a network monitor device) and/or observed in real time from the computer network 404.

The system is implemented by a processing device 402, which may be a physical or virtual computing system comprising a processor, memory, storage, and one or more network interfaces. In some embodiments, processing device 402 may correspond to a network monitor entity 104 and/or other entities described with respect to FIG. 1.

The processing device 402 receives and parses the network traffic 418 to identify handshake messages and session metadata for encrypted protocols, including TLS and SSH. In some embodiments, the processing device 402 utilizes a maintained registry of post-quantum cryptography (PQC) algorithms and non-post-quantum cryptography (non-PQC) algorithms to classify both proposed and negotiated algorithms that appear in handshake messages and connection metadata as being quantum-safe or quantum-unsafe. PQC algorithms include post-quantum key exchange and signature schemes deemed quantum-safe, and non-PQC algorithms include classical algorithms that are quantum-unsafe for the purposes of this detection. The PQC algorithms and non-PQC algorithms can each be represented as lists or rule sets used by the processing device 402 to determine whether a given communication is quantum-safe or quantum-unsafe. The handshake messages can, for example, be TLS ClientHello/ServerHello messages, or SSH key exchange messages. In some embodiments, when the handshake messages are SSH key exchange messages, the proposed one or more algorithms include at least one of key exchange (KEX) algorithms, server host key algorithms, encryption algorithms, message authentication code (MAC) algorithms, or compression algorithms. The processing device 402 may parse SSH KEXINIT payloads to extract the ordered algorithm lists advertised by the first entity 406, compare those lists to PQC algorithms and Non-PQC algorithms, and record the presence of any post-quantum KEMs or signature schemes offered during negotiation. In some implementations, the device 402 also inspects subsequent NEWKEYS and SERVICE_ACCEPT exchanges to confirm which selections took effect, improving fidelity when mapping proposed versus negotiated algorithms. Device 402 may be configured to detect different message signatures and formats depending on the protocol or protocols used in the connection attempt.

The first entity 406 and second entity 408 can each be a device, virtual machine, service, or workload communicatively coupled to the computer network 404. The processing device 402 detects, in the network traffic 418, an attempted first connection 410 initiated between the first entity 406 and the second entity 408 in which the first entity 406 offers at least one PQC algorithm 412 during the initial handshake exchange. In embodiments, the processing device 402 determines that the attempted first connection 410 failed when the handshake does not complete successfully or is interrupted, for example, by a reset, timeout, or message sequence that does not progress to a negotiated session.

Responsive to detecting the failed attempted first connection 410, the processing device 402 continues to monitor the network traffic 418 for subsequent sessions between the same endpoints. The processing device 402 detects a second connection 414 between the first entity 406 and the second entity 408 that successfully completes a handshake within a threshold time interval after the attempted first connection 410. The threshold time can be configurable (e.g., a setting) which is exposed to a user and/or adjusted automatically (e.g., to satisfy a target sensitivity). For example, processing logic may increase the threshold time, automatically, in response to a number of detected downgrade connections exceeding a threshold amount (and/or within a sliding time window).

The processing device 402 classifies the second connection 414 as quantum-unsafe by determining that the negotiated algorithm identified in the handshake of the second connection 414 matches a non-PQC algorithm 416 or is otherwise quantum unsafe.

In accordance with detecting the attempted first connection 410 offered at least one PQC algorithm 412 and failed, and the second connection 414 between the same endpoints successfully established within the threshold time after the attempted first connection 410 using a non-PQC algorithm 416 or no algorithm at all, the processing device 402 performs a remedial action 420.

In some embodiments, the remedial action 420 comprises at least one of: displaying an indication that the first entity 406 has experienced a cybersecurity attack; transmitting an alert indicating that the first entity 406 has experienced the cybersecurity attack; or filtering or blocking a future message to or from the first entity 406. In some embodiments, the remedial action 420 further includes storing an indication or updating a count that the entity has experienced the cybersecurity downgrade attack to a profile that is associated with a plurality of past connections of the first entity.

In further embodiments, alerts can be enriched with contextual metadata such as timestamps for the attempted first connection 410 and the second connection 414, identifiers of the PQC algorithm(s) 412 originally offered, the specific Non-PQC algorithm 416 ultimately negotiated, and network locations observed for each endpoint to facilitate triage. Enforcement actions may be pushed to one or more enforcement points on the computer network 404, including firewalls, switches, access points, or cloud security groups, with policies that quarantine the first entity 406, throttle specific protocols, or require PQC-only negotiation for designated destinations.

Figure 5:
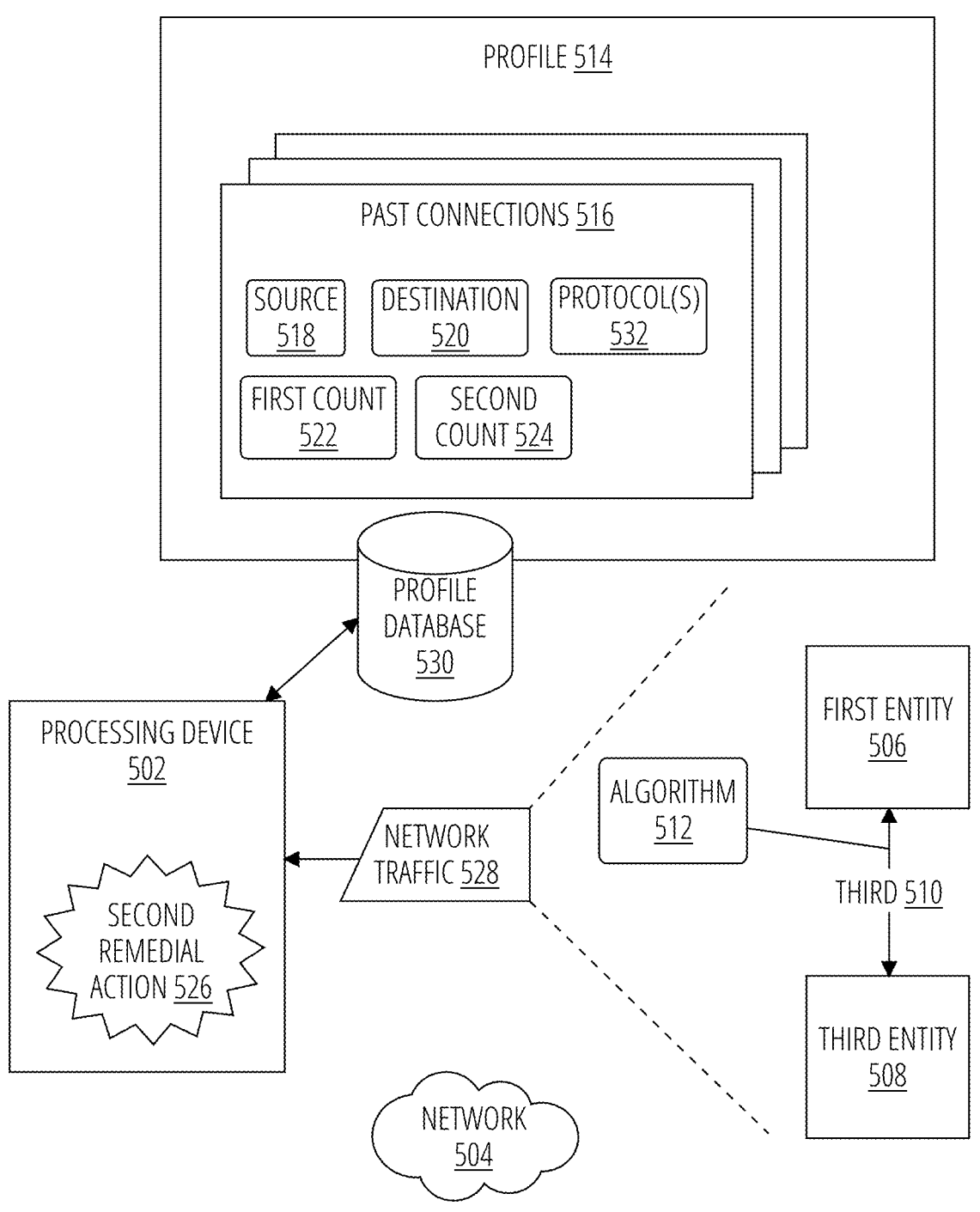
FIG. 5 illustrates a system configured to manage profiles based on historical communications of an entity, which are used to detect anomalous quantum-unsafe connections, in accordance with some embodiments.

FIG. 5 illustrates a system configured to manage profiles based on historical communications of an entity, which are used to detect anomalous quantum-unsafe connections, in accordance with some embodiments.

A processing device 502 is communicatively coupled to a network 504 and obtains and analyzes network traffic 528 that is associated with a first entity 506. The network 504 may comprise wired, optical, and wireless segments across private and public domains, and the network traffic 528 may be obtained from stored captures and logs (e.g., collected by a network monitor entity 104, an aggregation device 108, or other network component) and/or through real-time monitoring of network communications.

The first entity 506 can be a device, virtual machine, service, or workload connected to the network 504, and communicates with counterparties including a third entity 508 using encrypted protocols that negotiate cryptographic parameters during handshake exchanges. The processing device 502 parses the network traffic 528 to extract handshake metadata and to identify the algorithm 512 used to establish a connection, classifying it as quantum-safe (PQC) or quantum-unsafe (Non-PQC) according to a maintained registry.

The processing device 502 maintains, for the first entity 506, a profile 514 representing behavioral baselines derived from historical communications. The profile 514 is stored in a profile database 530 and includes past connections 516 observed for the first entity 506. Each entry of the past connections 516 corresponds to a tuple that identifies a source 518, a destination 520, and a protocol or protocols 532 (e.g., layer 7 protocol and/or layer 6 protocol), along with summary counters (first count, second count) that indicate historical cryptographic posture for that tuple.

The profile database 530 may be implemented using local or distributed storage and supports both read operations for detection and write operations for updates as new network traffic 528 is processed. In some implementations, profile 514 entries reference identifiers for the source 518 and destination 520, such as IP/MAC addresses, transport ports, hostnames, or certificate identities, to ensure stable correlation across sessions and protocol versions.

In some embodiments, the processing device 502 stores, for the first entity 506, the profile 514 associated with the plurality of past connections 516. Upon detecting in the network traffic 528 a third connection 510 between the first entity 506 and the third entity 508, processing device 502 compares an algorithm 512 used to establish the third connection 510 to the past connections 516 of the profile 514 to determine whether the third connection 510 is quantum-unsafe. If quantum-unsafe, the processing device 502 accesses the corresponding tuple for the source 518, destination 520, and protocol that are tied to the third connection 510, and retrieves the historical counters 522 and 524.

In some embodiments, the first count 522 indicates a number of quantum-safe connections observed between the source 518 and the destination 520 for that protocol or protocols, and the second count 524 indicates a number of quantum-unsafe connections observed between the source

518 and the destination 520 for that protocol or protocols. The processing device 502 updates these counts as new connections are observed and classified from the network traffic 528.

In some embodiments, the condition is satisfied when the algorithm 512 of the third connection 510 is a quantum-unsafe algorithm and when the first count 522 is below a threshold (indicating a strong history of bias by that entity toward quantum-safe communications). For example, a rule may specify that where the number of prior quantum-safe connections is small or zero for the source-destination-protocol tuple, any observation of a quantum-unsafe algorithm 512 is anomalous and indicates heightened downgrade or misconfiguration risk. In response to satisfying this condition, the processing device 502 performs the second remedial action 526, such as generating an anomaly alert, tagging the tuple for prioritized review, or other remedial actions.

In some embodiments, the condition is satisfied when the algorithm 512 of the third connection 510 is a quantum-unsafe algorithm and when the first count 522 is greater than the second count 524 (e.g., by a threshold amount). This rule captures cases where quantum-safe usage historically dominates for the tuple, but the third connection 510 deviates to a quantum-unsafe posture, suggesting a potential downgrade event or regression in cryptographic configuration. The processing device 502 may tune the threshold to balance sensitivity and precision, and, upon satisfying the rule, executes the second remedial action 526 with a severity commensurate with policy settings.

In some embodiments, the processing device 502 updates the profile 514 maintained in the profile database 530 to store only a most-recent N connections and/or only connections within a sliding time window for each profile, thereby ensuring that the first count 522 and second count 524 reflect current behavior. The windowing policy can be enforced by the processing device 502 and configured per protocol or entity class so that rapidly changing environments retain agility, while stable environments preserve sufficient history for robust detection. As new network traffic 528 is ingested, the processing device 502 rolls the counts forward, expires entries beyond the retention criteria, and persists the revised profile 514 to the profile database 530 for subsequent evaluations.

In some embodiments, the second remedial action 526 comprises at least one of: displaying an indication that the first entity 506 has exhibited anomalous cryptographic behavior; transmitting an alert to security systems with contextual details identifying the third connection 510, the algorithm 512 classification, the source 518, the destination 520, the application-layer protocol, and current values of the first count 522 and the second count 524; or instructing one or more enforcement points to filter, throttle, or segment future communications that match the tuple. The second remedial action 526 can include policy-driven escalations, such as requiring PQC-only negotiation for the destination 520, suspending non-PQC cipher support detected at the source 518, or initiating workflow tickets for remediation tracking, and/or other remedial actions.

In an aspect, a method is disclosed that include the operations described with respect to FIG. 5. The method may be performed by processing logic and/or a processing device in addition to, or alternative to the downgrade detection described in other sections. For example, processing logic may detect that a connection between an entity and another entity is established as an unsafe connection. In response, processing logic may access a profile corresponding to that established connection. The corresponding profile is keyed to a source (the entity) and destination (the other entity) of each of the past connections and one or more protocols used in that connection. Each profile comprises one or more historical counts (e.g., the first count and/or the second count), described above. Processing logic compares an algorithm used to establish the third connection to the past connections of the profile to determine that a condition is satisfied. For example, the algorithm is deemed to be unsafe, and if the first count is less than a threshold, the condition is satisfied and therefore an anomaly has occurred. In an example, if the first count is greater than the second count by a threshold, then the condition is satisfied and an anomaly has occurred. In accordance with when the condition is satisfied, processing logic performs a remedial action. Processing logic may otherwise refrain from taking action.

FIG. 6 illustrates an example method 600 for determining cybersecurity risk for network entities based at least on quantum safety in view of a downgrade attack, in accordance with some embodiments. Although the example method 600 depicts a particular sequence of operations, the sequence may be altered without departing from the scope of the present disclosure. Method 600 may be performed by processing logic which may be integral to one or more processing devices. Processing logic may comprise hardware (e.g., circuitry, dedicated logic, programmable logic, a processor, a processing device, a central processing unit (CPU), a system-on-chip (SoC), a transmitter, a receiver, etc.), software (e.g., instructions stored in memory executed by a processing device), firmware (e.g., microcode), or a combination thereof.

At block 602, processing logic accesses network traffic. In one embodiment, processing logic obtains network traffic via passive observation at one or more network vantage points, such as a SPAN/mirror port on a switch, a TAP, a firewall mirror, or a virtual switch in a hypervisor, or other input source. Processing logic parses and decodes packets for encrypted protocols including TLS/SSL and SSH. In an embodiment, the processing logic operates inline as a transparent proxy or sits logically behind a TLS/SSH-terminating device to observe handshake metadata. In some embodiments, processing logic acquires telemetry from infrastructure APIs and logs (e.g., NetFlow/IPFIX enriched with TLS fingerprints, Zeek logs, firewall or NGFW TLS/SSH inspection logs) to reconstruct handshake offers and outcomes.

At block 604, processing logic detects, in the network traffic, an attempted first connection between a first entity and a second entity in which the first entity offered at least one post-quantum cryptography (PQC) algorithm to encrypt the attempted first connection. The processing logic parses protocol fields required to identify proposed and negotiated algorithms, including but not limited to TLS ClientHello/ServerHello parameters and SSH KEXINIT proposals and subsequent key exchange messages. The traffic may be processed in real time or near-real time, or retrieved from short-term packet captures or log stores. Session data (e.g., each connection or connection attempt) may be keyed by relevant attributes, SNI/hostnames, and protocol identifiers. In some embodiments, processing logic identifies an attempted first connection between a first entity (e.g., a client) and a second entity (e.g., a server) by correlating SYN/SYN-ACK sequences and protocol handshakes, extracting handshake offers, and determining that the first entity offered at least one post-quantum cryptography (PQC) algorithm. For TLS, the logic parses the handshake (e.g., ClientHello) to read supported key exchange groups, signature algorithms, and any PQC extension parameters and compares them to a curated list of PQC options. For SSH, processing logic may parse KEXINIT to enumerate proposed KEX, server host key, encryption, MAC, and compression algorithms, and determines that PQC KEX (e.g., ML-KEM or another PQC algorithm) is present. Each connection or attempted connection in the network traffic may comprise corresponding metadata such as, for example, timestamps, source and destination addresses and ports, L7 protocol, the offered algorithm set, and a session identifier to support later correlation.

At block 606, processing logic detects, in the network traffic, that the attempted first connection failed. In some embodiments, processing logic determines failure by observing handshake non-completion within a protocol-specific timeout window, a TCP reset (RST) emitted by either peer during or immediately after handshake messages, or explicit alert/termination messages (e.g., TLS fatal alerts) that preclude session establishment. In some embodiments, failure is inferred when the server never responds beyond an initial SYN-ACK or when the handshake is aborted.

At block 608, processing logic detects, in the network traffic, that a second connection between the first entity and the second entity successfully completed a handshake, occurred within a threshold time after the attempted first connection, and was established without a PQC algorithm (e.g., with a non-PQC algorithm or no encryption at all). In one embodiment, processing logic monitors for a second connection between the same first and second entities, via a combination of client/server IPs, MACs, hostnames/SNI, and, where applicable, server port and application-layer protocol- and detects that this second connection successfully completed a handshake within a threshold time after the failed attempt identified at block 606.

At block 610, processing logic performs a remedial action, in accordance with detecting that the second connection between the first entity and the second entity established without the PQC algorithm within the threshold time after the attempted first connection. These actions can include generating and displaying an alert indicating a suspected downgrade from quantum-safe to quantum-unsafe encryption, transmitting a notification to external systems, persisting an incident record with the full handshake evidence, timing, algorithm details, and/or other remedial actions described in other sections.

In some embodiments, processing logic further stores a profile associated with a plurality of past connections of a first entity, the profile indicating whether each past connection was established using a respective post-quantum cryptography (PQC) algorithm or a non-PQC algorithm. Processing logic detects, in observed network traffic, a third connection between the first entity and a third entity and compares one or more algorithms used to establish the third connection against the stored profile to evaluate whether a condition is satisfied. In response to the condition being satisfied, processing logic performs a second remedial action. In some embodiments, the third entity may correspond to the second entity and the third connection may correspond to the second connection. In such a case, processing logic may identify a downgrade attempt and an anomaly simultaneously, in the same connection. Additionally, or alternatively, they may be different entities and connections, occurring at different times.

In some embodiments, processing logic maintains, for each of the plurality of past connections in the profile, source and destination identifiers, an application-layer protocol identifier, a first count representing the number of quantum-safe (PQC) connections made between the source and the destination using that protocol, and a second count representing the number of quantum-unsafe (non-PQC) connections made between the source and the destination using that protocol. In some embodiments, processing logic determines that the condition is satisfied when the algorithm of the third connection is a non-PQC algorithm and a first count of quantum-safe (PQC) connections in the profile is below a specified threshold. In some embodiments, processing logic determines that the condition is satisfied when the algorithm of the third connection is a non-PQC algorithm and a first count of quantum-safe (PQC) connections in the profile exceeds a second count of quantum-unsafe (non-PQC) connections by at least a threshold amount. In some embodiments, processing logic updates the profile on an ongoing basis by retaining only the most recent N connections or by retaining only those connections within a sliding time window, thereby ensuring that determinations are made against a current representation of connection behavior.

In an embodiment, processing logic generates or updates a cybersecurity risk score, based on detecting that a downgrade attack has occurred (e.g., in response to the conditions being met at block 610). In some embodiments, processing logic may take additional or alternative remedial action, such as pushing segmentation or ACL updates at nearest enforcement points to temporarily block or filter subsequent non-PQC connections between the entities, enforcing a PQC-required policy tag on the service, throttling retries to disrupt automated downgrade loops, redirecting traffic to inspection/sandbox services, and/or auto-quarantine of the entity when repeated downgrade patterns and/or anomalies exceed a threshold within a sliding window.

Figure 7:
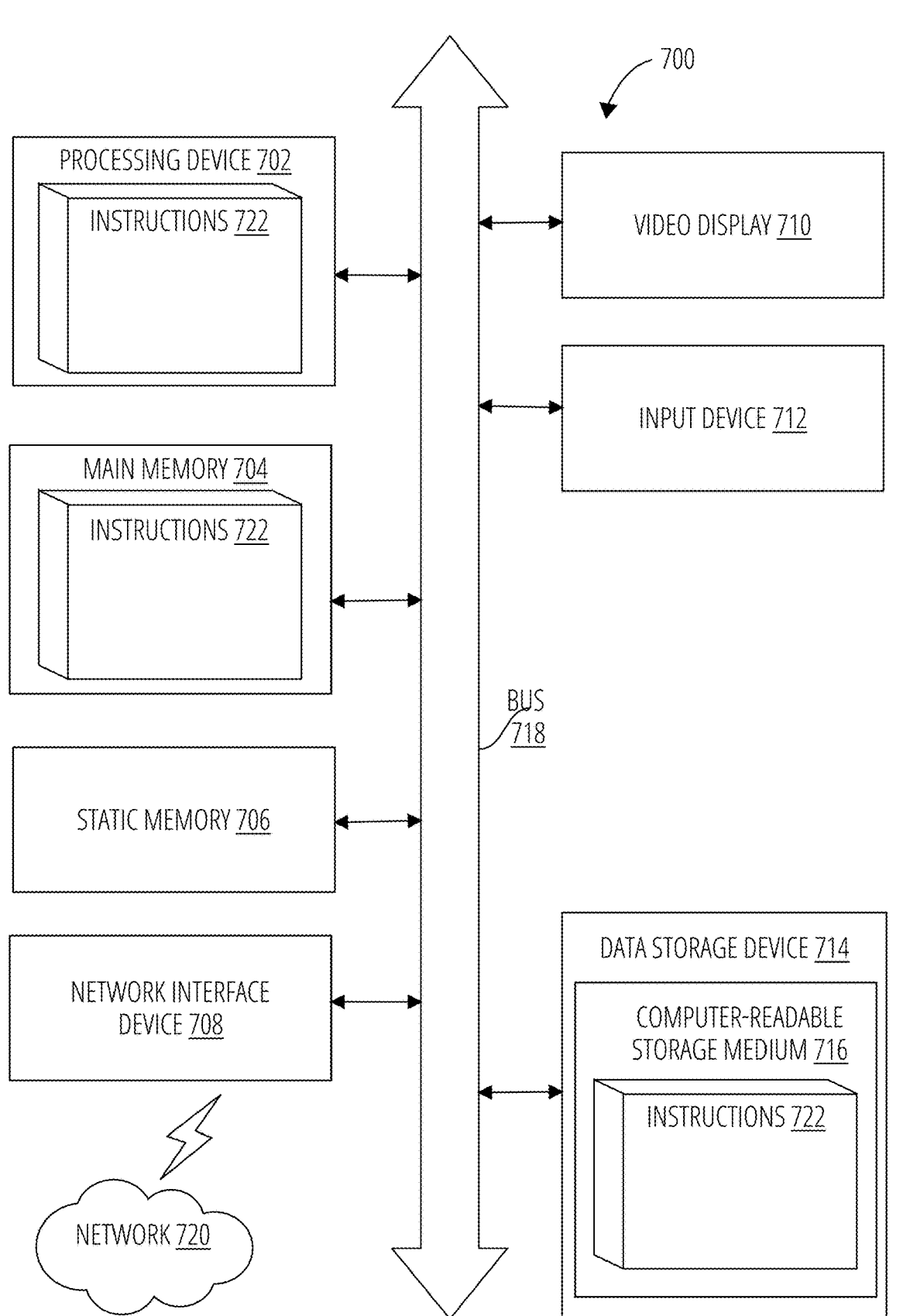
FIG. 7 is a block diagram illustrating an example computer system, in accordance with some embodiments.

FIG. 7 is a block diagram illustrating an example computer system 700, in accordance with some embodiments. This can be understood as a diagrammatic representation of a machine in the example form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. In some embodiments, computer system 700 may be representative of a server, such as network monitor entity 104, a processing device as described above.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 714, which communicate with each other via a bus 718. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 722 to cause the processing device 702 to perform the operations described herein such as with respect to method 600, as discussed herein.

The data storage device 714 may include a machine-readable computer-readable storage medium 716, on which is stored one or more set of instructions 722 (e.g., software) embodying any one or more of the methodologies of operations described herein, including instructions to cause the processing device 702 to perform the operations described with respect to method 600 or other methods described. The instructions 722 may also reside, completely or at least partially, within the main memory 704 or within the processing device 702 during execution thereof by the computer system 700; the main memory 704; and the processing device 702 also constituting machine-readable storage media. The instructions 722 may further be transmitted or received over a network 720 via the network interface device 708.

The computer system 700 also may include a video display unit 710 (e.g., a liquid crystal display (LCD) or a cathode ray tube (CRT)) and an input device 712 (e.g., a keyboard or mouse). In one embodiment, video display unit 710 and input device 712 may be combined into a single component or device (e.g., an LCD touch screen).

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, performed by a processing device, comprising:
accessing network traffic;
detecting, in the network traffic, an attempted first connection between a first entity and a second entity in which the first entity offered at least one post-quantum cryptography (PQC) algorithm to encrypt the attempted first connection;
detecting, in the network traffic, that the attempted first connection failed;
detecting, in the network traffic, that a second connection between the first entity and the second entity successfully completed a handshake, occurred within a threshold time after the attempted first connection, and was established without a PQC algorithm; and
performing a remedial action, in accordance with detecting that the second connection between the first entity and the second entity established without the PQC algorithm within the threshold time after the attempted first connection, wherein the remedial action comprises at least filtering or blocking a future message to or from the first entity.

2. The method of claim 1, wherein determining that the second connection was established without the PQC algorithm comprises comparing a negotiated algorithm identified in a handshake message of the second connection to a list indicating PQC algorithms or non-PQC algorithms or both.

3. The method of claim 1, wherein detecting the attempted first connection comprises comparing one or more algorithms identified in a handshake message to a list indicating PQC algorithms or non-PQC algorithms or both, to determine that the first entity offered the at least one PQC algorithm.

4. The method of claim 1, wherein the remedial action further comprises at least one of:
displaying an indication that the first entity has experienced a cybersecurity attack, or
transmitting an alert indicating that the first entity has experienced the cybersecurity attack.

5. The method of claim 1, further comprising increasing the threshold time in response to a number of detected downgrade connections exceeding a threshold.

6. The method of claim 1, further comprising:
storing a profile associated with a plurality of past connections of the first entity;
detecting, in the network traffic, a third connection between the first entity and a third entity; and
comparing an algorithm used to establish the third connection to the plurality of past connections of the profile to determine that a condition is satisfied; and
performing a second remedial action, in accordance with when the condition is satisfied.

7. The method of claim 6, wherein the profile comprises, for each of the plurality of past connections, a source, a destination, an application-layer protocol, a first count of quantum-safe connections made between the source and the destination using the application-layer protocol, and a second count of quantum-unsafe connections made between the source and the destination.

8. The method of claim 7, wherein the condition is satisfied when the algorithm of the third connection is a non-PQC algorithm and when the first count is below a threshold.

9. The method of claim 7, wherein the condition is satisfied when the algorithm of the third connection is a non-PQC algorithm and when the first count is greater than the second count by a threshold amount.

10. The method of claim 7, further comprising updating the profile to store the plurality of past connections with: only most-recent N connections; or only connections within a sliding time window.

11. A system, comprising:
a memory; and
a processing device, operatively coupled to the memory, to:
access network traffic;
detect, in the network traffic, an attempted first connection between a first entity and a second entity in which the first entity offered at least one post-quantum cryptography (PQC) algorithm to encrypt the attempted first connection;
detect, in the network traffic, that the attempted first connection failed;
detect, in the network traffic, that a second connection between the first entity and the second entity successfully completed a handshake, occurred within a threshold time after the attempted first connection, and was established without a PQC algorithm; and
perform a remedial action, in accordance with detecting that the second connection between the first entity and the second entity established without the PQC algorithm within the threshold time after the attempted first connection, wherein the remedial action comprises at least filtering or blocking a future message to or from the first entity.

12. The system of claim 11, wherein to determine that the second connection was established without the PQC algorithm comprises to compare a negotiated algorithm identified in a handshake message of the second connection to a list indicating PQC algorithms or non-PQC algorithms or both.

13. The system of claim 11, wherein to detect the attempted first connection comprises:
to compare one or more algorithms identified in a handshake message to a list indicating PQC algorithms or non-PQC algorithms or both, to determine that the first entity offered the at least one PQC algorithm.

14. The system of claim 13, wherein the processing device is further to:
store a profile associated with a plurality of past connections of the first entity;
detect, in the network traffic, a third connection between the first entity and a third entity; and
compare an algorithm used to establish the third connection to the plurality of past connections of the profile to determine that a condition is satisfied; and
perform a second remedial action, in accordance with when the condition is satisfied.

15. The system of claim 14, wherein the profile comprises, for each of the plurality of past connections, a source, a destination, an application-layer protocol, a first count of quantum-safe connections made between the source and the destination using the application-layer protocol, and a second count of quantum-unsafe connections made between the source and the destination.

16. A non-transitory computer readable medium having instructions encoded thereon that, when executed by a processing device, cause the processing device to:
access network traffic;
detect, in the network traffic, an attempted first connection between a first entity and a second entity in which the first entity offered at least one post-quantum cryptography (PQC) algorithm to encrypt the attempted first connection;
detect, in the network traffic, that the attempted first connection failed;
detect, in the network traffic, that a second connection between the first entity and the second entity successfully completed a handshake, occurred within a threshold time after the attempted first connection, and was established without a PQC algorithm; and
perform a remedial action, in accordance with detecting that the second connection between the first entity and the second entity established without the PQC algorithm within the threshold time after the attempted first connection, wherein the remedial action comprises at least filtering or blocking a future message to or from the first entity.

17. The non-transitory computer readable medium of claim 16, wherein to determine that the second connection was established without the PQC algorithm comprises to compare a negotiated algorithm identified in a handshake message of the second connection to a list indicating PQC algorithms or non-PQC algorithms or both.

18. The non-transitory computer readable medium of claim 16, wherein to detect the attempted first connection comprises:
to compare one or more algorithms identified in a handshake message to a list indicating PQC algorithms or non-PQC algorithms or both, to determine that the first entity offered the at least one PQC algorithm.

19. The non-transitory computer readable medium of claim 18, wherein the processing device is further to:
store a profile associated with a plurality of past connections of the first entity; detect, in the network traffic, a third connection between the first entity and a third entity; and
compare an algorithm used to establish the third connection to the plurality of past connections of the profile to determine that a condition is satisfied; and
perform a second remedial action, in accordance with when the condition is satisfied.

20. The non-transitory computer readable medium of claim 19, wherein the profile comprises, for each of the plurality of past connections, a source, a destination, an application-layer protocol, a first count of quantum-safe connections made between the source and the destination using the application-layer protocol, and a second count of quantum-unsafe connections made between the source and the destination.

* * * * *